United States Patent [19]

Lundberg

[11] Patent Number: 5,990,569
[45] Date of Patent: Nov. 23, 1999

[54] SYSTEM FOR TRIGGERING A PROTECTING DEVICE

[75] Inventor: Leif Lundberg, Motala, Sweden

[73] Assignee: Nokia Audio & Electronics AB, Motala, Sweden

[21] Appl. No.: 08/817,407

[22] PCT Filed: Oct. 3, 1995

[86] PCT No.: PCT/SE95/01128

§ 371 Date: May 28, 1997

§ 102(e) Date: May 28, 1997

[87] PCT Pub. No.: WO96/10497

PCT Pub. Date: Apr. 11, 1996

[30] Foreign Application Priority Data

Oct. 4, 1994 [SE] Sweden .................................. 9403359

[51] Int. Cl.[6] .................................................. B60R 21/32
[52] U.S. Cl. .......................... 307/10.1; 180/282; 280/735
[58] Field of Search .................................... 307/9.1, 10.1, 307/121; 701/45–47; 280/727, 734, 735, 806; 180/271–274, 282

[56] References Cited

U.S. PATENT DOCUMENTS

| | | | |
|---|---|---|---|
| 4,504,082 | 3/1985 | Brown, Jr. et al. .................... | 307/10.1 |
| 4,740,741 | 4/1988 | Andres et al. ........................ | 280/235 |
| 5,194,755 | 3/1993 | Rhee et al. ........................... | 307/10.1 |
| 5,216,284 | 6/1993 | Mattes et al. ........................ | 307/10.1 |
| 5,749,059 | 5/1998 | Walton ................................. | 701/45 |

FOREIGN PATENT DOCUMENTS

| | | |
|---|---|---|
| 2123359 | 1/1972 | Germany . |
| 4028956 | 3/1991 | Germany . |
| 3506487 | 9/1996 | Germany . |
| WO 88/00896 | 2/1988 | WIPO . |
| WO 90/02440 | 3/1990 | WIPO . |
| WO 90/02673 | 3/1990 | WIPO . |
| WO 93/17893 | 9/1993 | WIPO . |

*Primary Examiner*—Richard T. Elms
*Attorney, Agent, or Firm*—Bacon & Thomas

[57] ABSTRACT

A system for connecting an ignition device to a direct current network wherein the ignition device is capable of being activated for triggering a safety device in an emergency. For example, the safety device can be constituted of a safety belt tensioner or an airbag in a vehicle arranged to be inflated by a gas generator upon detection of a certain deceleration of the vehicle. At least one safety device is connected to an internal network of the vehicle via an electronic unit including at least one acceleration sensor and an arrangement for the generation of a direct current voltage for activating the ignition device at a given deceleration, the direct current voltage generated being higher than the internal line voltage. The system is dimensioned such that the direct current network of the vehicle does not have a potential that is high enough to activate the ignition device.

16 Claims, 2 Drawing Sheets

SYSTEM FOR TRIGGERING A PROTECTING DEVICE

FIELD OF THE INVENTION

The present invention relates to a system for connecting an ignition device to a direct current network.

STATE OF ART AND SUMMARY OF THE INVENTION

When developing a product of modern vehicles, for example, great attention is directed to the safety of the passengers. From a marketing point of view as well as a safety point of view airbag systems have had a great importance during the last years, in addition to safety devices as deformation zones in the car body, suitably designed fittings and safety belts.

A modern airbag system may consist of control electronics, ignition devices and gas generators for one or more airbags and possibly pyrotechnical safety belt tensioner.

An embodiment of the present invention discloses a system for connecting, at deceleration, at least one releaseable safety device, an airbag for example, or a safety belt tensioner, to a vehicle. Preferably, the system comprises an electronic unit including at least one acceleration sensor or the like, which electronic unit is connected to the internal power supply network of the vehicle and to an ignition device for the safety device. The ignition device, including a heating filament, for example, is arranged for triggering the safety device, a gas generator for inflating an airbag, for example, if an acceleration sensor detects a deceleration of a preset amount.

However, the system mentioned often has the disadvantage that the respective ignition device is arranged to be triggered approximately at a direct-current voltage that is the same or even lower than the voltage of battery of the vehicle, and thus, if there is a malfunction the cables or the circuits, for example causing a shortcircuiting of the connections of the ignition device and the power supply network of the vehicle, the safety device is triggered. Even if such an error may be detected it is not assurable that, thereafter, one can prevent triggering of the safety device belonging to it. Thus, the error may consist of, that in an electric ignition device, directly at the connections or in the cabling connecting the electronic unit with the ignition device, one pole is unintentionally brought into contact with the battery supply of the vehicle (e.g., 12–16 volts) and the other pole with the chassis (ground) of the vehicle. Thus, in this situation an airbag can be inflated and if this happens in a traffic situation this implies obvious risks for the driver, the passengers and the road users.

A solution of this problem is shown in Published Patent Document No. WO 90/02673, indicating a system where an electric ignition device can be activated only by an a.c.-signal greater than the internal d.c.-voltage of the vehicle. The ignition device is directly at its connections connected in series with a capacitor. The electric system (12–16 V. d.c.) of the vehicle is not able to activate the ignition device.

The present invention indicates another solution of the problem mentioned, viz. preventing the safety device from being unintentionally triggered if the connections or cabling to the ignition device are short-circuited by mistake.

The novel features of the invention are indicated in the accompanying claims.

BRIEF DESCRIPTION OF THE DRAWINGS

Now, the invention will be explained in greater detail by means of embodiments with reference to the drawings, wherein.

DESCRIPTION OF EMBODIMENTS OF THE INVENTION

Figure 1:
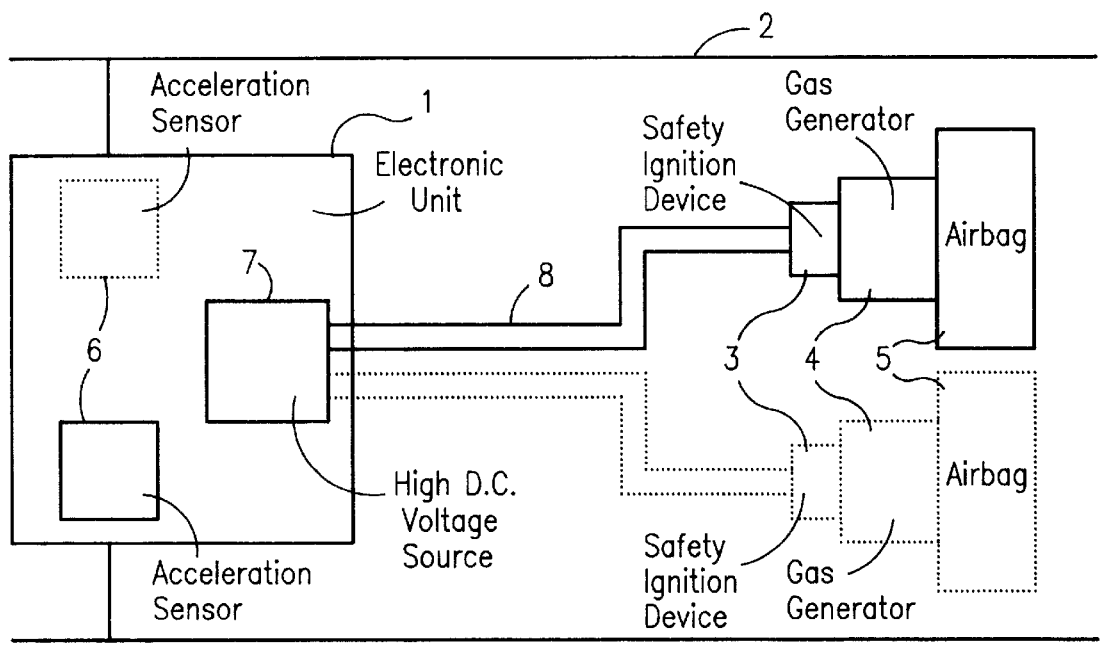
FIG. 1 indicates diagrammatically a safety device connected to the internal network of a vehicle according to an embodiment of the invention, FIG. 2 indicates diagrammatically an ignition device and a gas generator according to an embodiment of the invention, FIG. 3 indicates diagrammatically an ignition device according to an embodiment of the invention, FIG. 4 indicates diagrammatically an electronic unit according to an embodiment of the invention.

FIG. 1 indicates an electronic unit 1 connected to the internal eletrical network 2 of a vehicle at voltage V and to at least one ignition device 3 of a safety device, in this case a gas generator 4 arranged to be able to inflate an airbag 5, which can be arranged in the steering-wheel of a vehicle or at the driver/passenger place or at any other appropriate place protecting the driver and the passengers from knocking their heads forwards or aside in an accident or the like. In the drawing there are two airbag systems 4–5 connected, but it is obvious that several airbag systems can be connected to the electronic unit 1. The safety system may include pyrotechnical safety belt tensioners.

In the electronic unit 1 there is arranged at least one acceleration sensor 6, being able to detect deceleration at least in one direction and to provide a deceleration energizing signal. Besides, there can be arranged additional acceleration sensors detecting acceleration/deceleration in other directions. Furthermore, in the electronic unit 1 there is an arrangement 7 generating a high d.c. voltage, i.e. significantly higher than the internal line voltage of the vehicle (12–16 volts). The arrangement 7 is connected with the respective ignition device 3 via conductors 8.

Thus, when an acceleration sensor 6 detects an acceleration/deceleration exceeding a preset value, the electronic unit 1 is arranged such that a high voltage is generated by the arrangement 7 in response to the emergency signal, and the light voltage can be applied to the respective ignition device 3, which is activated and, by means of the heating filament in the ignition device 3, initiates the corresponding gas generator 4, or the like, for inflating the respective airbag 5. All this takes place very rapidly, in about 5–50 milliseconds. If, unintentionally, the conductors get into contact with the internal network 2, the airbag system 4–5 can not be triggered, as the voltage of the internal network (12–16 volts) is not high enough to activate the ignition device 3.

Figure 2:
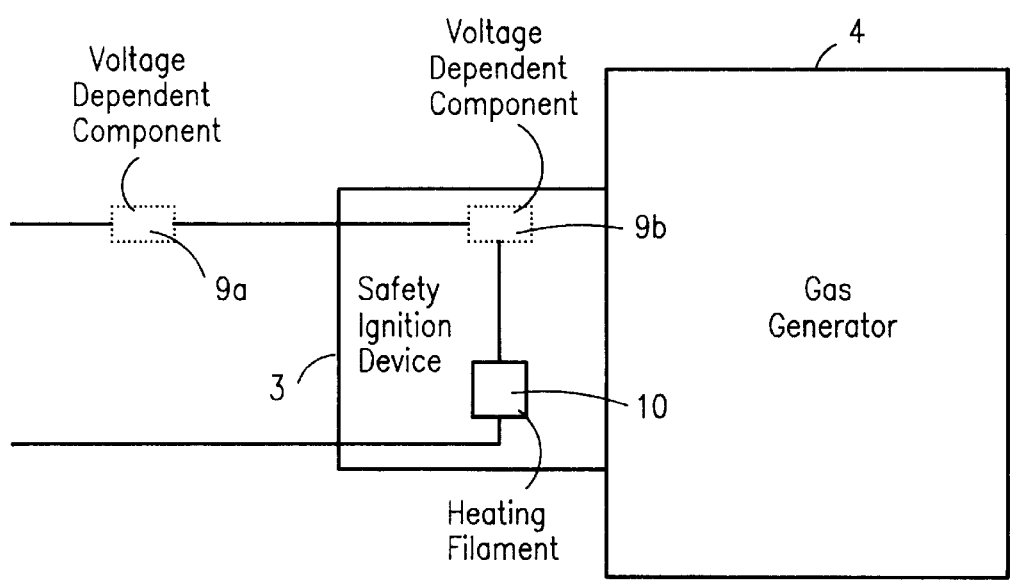

FIG. 2 indicates an ignition device 3 and a gas generator 4 according to the FIG. 1. At least one voltage dependent series component 9a, 9b is connected with the cables 8. This component can be arranged in the connection 9a of the ignition device 3 or constitute an integrated part 9b of the ignition device 3. For example, the voltage dependent series component 9a, 9b can be a diac or TRANSIL™ diode or another semi-conductor component with the quality of being able to conduct only a very low currrent up to the point where the potential of the component exceeds a threshold value. In the present case this threshold value is chosen such that it exceeds those 12–16 volts offered by the electric supply network of the vehicle. According to another embodiment a voltage dependent resistor 9 is used, see FIG. 3, which is separate, or possibly part of the heating filament 10, which can be found in the ignition device 3 for starting the gas generator 4, which heating filament 10 then must be dimensioned for this high internal resistance.

Figure 3:
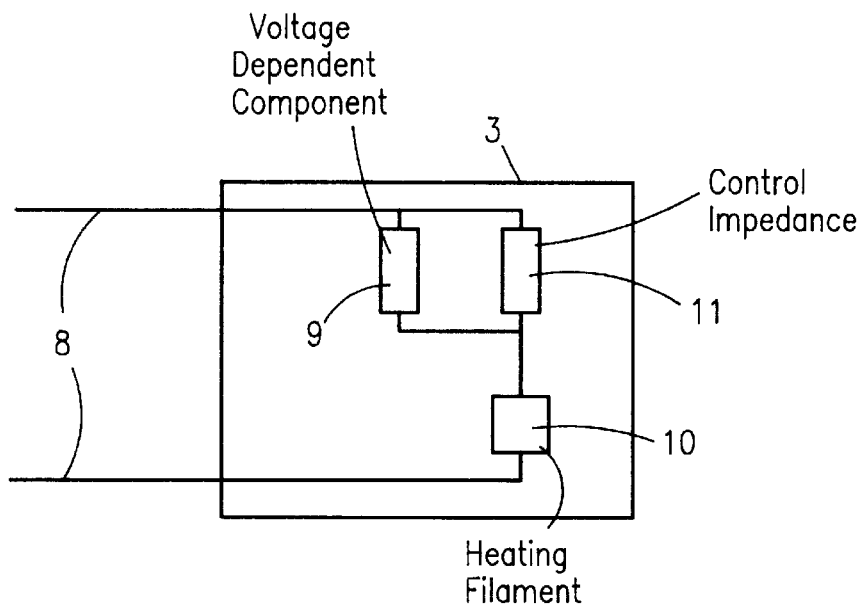

The FIG. 3 indicates an embodiment of the ignition device 3 more in detail, the voltage dependent component 9 being connected in series with the heating filament 10. A control impedance 11 is connected in parallel with the voltage dependent component 9. This impedance is chosen such that it can not conduct an activating current but only a control current generated by the electric unit 1 in a special control device, as is explained below. D.C. as well as A.C. can be used for this control current.

Figure 4:
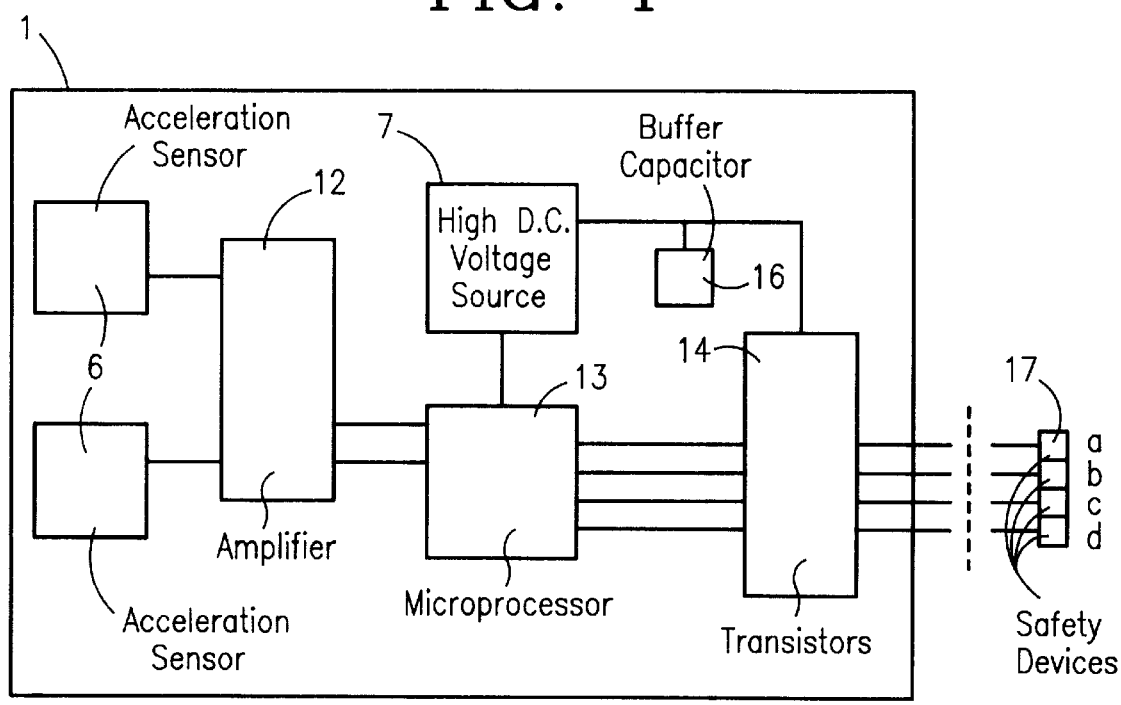

The FIG. 4 indicates an embodiment of control electronics for safety systems according to the invention. An electronic unit 1 is arranged permanently in the vehicle body, and in case of a deceleration one or more acceleration sensors 6, which are comprised in the electronic unit 1, detect a signal which is filtered and amplified in an amplifier 12, after which a microprocessor 13, which is included in the electronic unit, analyses and compares the signals with predetermined criteria and threshold values. If the vehicle according to these critera is found to be in a collision situation requiring triggering of the safety system, the microprocessor 13 activates one or more ignition transistors 14, involving transmitting of the energy, generated in a buffer capacitor 16, via the voltage generator 7, to the ignition device 3 of the gas generator 4, and at the same time or in a sequence within 5–50 ms, the different corresponding safety devices 17a–17d are triggered. As an example, the safety device 17a can be an airbag arranged for the driver, 17b an airbag arranged for protecting the passenger, 17c a safety belt stretcher for the driver and 17d a safety belt stretcher for the passenger. Of course, other types of driver and passengers safety devices are possible.

Parallel with the analysis of the signals from the acceleration sensors 6 included in the electronic unit 1, continuously, a control of all the functions included in the electronic unit 1 and in the safety devices 4–5, 17, are carried out. This is done continuing to guarantee the function of the system, and to warn the driver, via the warning indicator, of a defect and, in case of a critical situation, to disconnect the safety devices. Normally, this control is done several times every second, and the control impedance 11 indicated in FIG. 3 is used in a bridge coupling, measuring the ignition device being connected and the correct value of the resistance.

I claim:

1. An electrical energization system for a D.C. voltage operated ignition device arranged to trigger a safety device in an emergency, comprising:

a D.C. power supply network operating at a first voltage that is insufficient to activate said ignition device;

a voltage generator arrangement connected to the power supply network and arranged to provide a second D.C. power supply at a second voltage that is higher than said first voltage;

said ignition device connected to said second power supply and configured so as to be electrically activatable by the second voltage but not activatable by said first voltage.

2. The electrical energization system according to claim 1, wherein said safety device is an occupant safety device in a vehicle and wherein said D.C. power supply network is the vehicle D.C. power supply; and further comprising an electronic unit including an emergency sensor for sensing an emergency by detecting vehicle deceleration exceeding a predetermined threshold and providing a deceleration emergency signal upon occurrence of such deceleration; said ignition device connected to said electronic unit so as to be activated by said second voltage in response to the occurrence of said deceleration emergency signal.

3. The electrical energization system according to claim 2, including a voltage dependent component connected in series with the ignition device, said voltage dependent component being arranged to supply a current to said igniter only when a voltage greater than said first voltage is supplied to said voltage dependent component.

4. The electrical energization system according to claim 3, wherein said voltage dependent component is integrated with said ignition device.

5. The electrical energization system according to claim 4, wherein said voltage dependent component comprises a semi-conductor device.

6. The electrical energization system according to claim 4, wherein said voltage dependent component is a voltage dependent resistor.

7. The electrical energization system according to claim 3, wherein said voltage dependent component comprises a semi-conductor device.

8. The electrical energization system according to claim 3, wherein said voltage dependent component is a voltage dependent resistor.

9. The electrical energization system according to claim 3, including a control device connected to said D.C. vehicle power supply network for supplying activation and control currents for respectively activating and controlling the ignition device in response to detected parameters indicative of an emergency and the electrical condition of the voltage dependent component; said voltage generator constituting part of said control device; and an impedance device connected in parallel with the voltage dependent component, said impedance device being incapable of conducting an ignition device activation current but being capable of conducting an ignition device control current.

10. The electrical energization system according to claim 9, said control device including a buffer capacitor connected to said second D.C. power supply, and at least one ignition transistor for controlling supply of electrical activation current to said ignition device from said d.c. power supply network and said buffer capacitor; said at least one ignition transistor arranged to be controlled in response to the ignition device control current.

11. The electrical energization system according to claim 10, wherein said safety device is a vehicle airbag.

12. The electrical energization system according to claim 10, wherein said safety device is a safety belt tensioner.

13. The electrical energization system according to claim 3, wherein said voltage dependent component is arranged in a connection of the ignition device.

14. The electrical energization system according to claim 3, wherein said voltage dependent component constitutes an integral part of the ignition device.

15. The electrical energization system according to claim 2, wherein said safety device is a vehicle airbag.

16. The electrical energization system according to claim 2, wherein said safety device is a safety belt tensioner.

* * * * *

UNITED STATES PATENT AND TRADEMARK OFFICE
CERTIFICATE OF CORRECTION

PATENT NO. : 5,990,569
DATED : November 23, 1999
INVENTOR(S) : Leif LUNDBERG

It is certified that error appears in the above-identified patent and that said Letters Patent is hereby corrected as shown below:

ON THE TITLE PAGE:

Please change the Assignee as follows:

--[73] Assignee: Autoliv Nokia AB,
Motala, Sweden--

Signed and Sealed this

Second Day of January, 2001

*Attest:*

Q. TODD DICKINSON

*Attesting Officer*  *Commissioner of Patents and Trademarks*